(12) United States Patent
Shimakura et al.

(10) Patent No.: US 10,409,308 B2
(45) Date of Patent: Sep. 10, 2019

(54) ELECTRIC POWER TRANSMISSION FACILITY PLANNING SUPPORT SYSTEM AND THE METHOD THEREOF

(71) Applicant: Hitachi, Ltd., Chiyoda-ku, Tokyo (JP)

(72) Inventors: Satoshi Shimakura, Tokyo (JP); Yoshikazu Ishii, Tokyo (JP); Masataka Imabayashi, Tokyo (JP)

(73) Assignee: Hitachi, Ltd., Tokyo (JP)

(*) Notice: Subject to any disclaimer, the term of this patent is extended or adjusted under 35 U.S.C. 154(b) by 318 days.

(21) Appl. No.: 15/050,971

(22) Filed: Feb. 23, 2016

(65) Prior Publication Data
US 2016/0246319 A1 Aug. 25, 2016

(30) Foreign Application Priority Data

Feb. 24, 2015 (JP) ................. 2015-033490

(51) Int. Cl.
*G05F 1/66* (2006.01)
*G05B 15/02* (2006.01)
*G06Q 50/06* (2012.01)

(52) U.S. Cl.
CPC .............. *G05F 1/66* (2013.01); *G05B 15/02* (2013.01); *G06Q 50/06* (2013.01)

(58) Field of Classification Search
CPC ............ G05F 1/66; G05B 15/02; G06Q 50/06
USPC ................................................ 700/295, 286
See application file for complete search history.

(56) References Cited

U.S. PATENT DOCUMENTS

2010/0235285 A1* 9/2010 Hoffberg .............. G06Q 20/401
705/75

FOREIGN PATENT DOCUMENTS

| JP | 2004-242411 A | 8/2004 |
|----|---------------|--------|
| JP | 2007-68337 A  | 3/2007 |
| JP | 2010-11554 A  | 1/2010 |
| JP | 2013-126260 A | 6/2013 |

OTHER PUBLICATIONS

Examination Report issued in counterpart Indian Application No. 201614005590 dated Dec. 28, 2018 with unverified English translation (five pages).

* cited by examiner

*Primary Examiner* — Gene N Auduong
(74) *Attorney, Agent, or Firm* — Crowell & Moring LLP

(57) ABSTRACT

An electric power transmission facility planning support system for materializing facility planning including the facility expansion of an electric power transmission network is provided based on the system information of a power system. This support system includes an output control quantity calculation device for deriving the output control quantities of natural variation power supplies in consideration of the operation limit value of the network; and a facility expansion planning device for making the facility planning based on one of the type, location, and capacity of an electric power transmission facility considering the output control quantities.

7 Claims, 14 Drawing Sheets

| TYPE OF NATURAL VARIATION POWER SUPPLY | WIND POWER PLANT | | | | | | | |
|---|---|---|---|---|---|---|---|---|
| NAME OF NATURAL VARIATION POWER SUPPLY | WIND POWER PLANT A | | | | | | | |
| LOCATION OF POWER SUPPLY | AREA A | | | | | | | |
| CAPACITY | 10 [MW] | | | | | | | |

| PROBABILITY DISTRIBUTION OF OUTPUT OF POWER SUPPLY | OUTPUT [MW] | 0 | | | 1 | | | ... | |
| --- | --- | --- | --- | --- | --- | --- | --- | --- | --- |
| | PROBABILITY [%] | 20 | | | 10 | | | ... | |
| PROBABILITY DISTRIBUTION OF OUTPUT VARIATION RANGE | OUTPUT VARIATION RANGE [MW/min] | −1 | 0 | 1 | −1 | 0 | 1 | ... | ... |
| | PROBABILITY [%] | 0 | 60 | 40 | 40 | 20 | 40 | ... | ... |

FIG. 5

| BUS LINE | BUS LINE 1 | BUS LINE 2 | ... |
|---|---|---|---|
| VOLTAGE CLASS [kV] | 275 | | |
| MAXIMUM VALUE OF ACTIVE POWER [MW] | 100 | ... | ... |
| MAXIMUM VALUE OF REACTIVE POWER [Mvar] | 50 | ... | ... |
| UPPER LIMIT OF VOLTAGE [kV] | 285 | ... | ... |
| LOWER LIMIT OF VOLTAGE [kV] | 265 | ... | ... |
| UPPER LIMIT OF PHASE DIFFERENCE ANGLE [°] | 2.2 | ... | ... |
| LOWER LIMIT OF PHASE DIFFERENCE ANGLE [°] | -2.2 | ... | ... |

FIG. 6

| TYPE OF EXPANDED FACILITY | SVC | | POWER CAPACITOR | | ... |
|---|---|---|---|---|---|
| CAPACITY | [MVA] | | [Mvar] | | ... |
| | 1 | 2 | ... | 1 | ... | ... |
| FACILITY INTRODUCTION COST [TEN THOUSAND YEN] | 800 | ... | ... | ... | ... |
| MAINTENANCE COST [YEN/YEAR] | △△ | ... | ... | ... | ... |

FIG. 7

| LOCATION | CONSUMING REGION A | | | | CONSUMING REGION B | ... |
|---|---|---|---|---|---|---|
| DATA | 2015/1/1 | | 2015/1/2 | ... | ... | ... |
| TIME | 0 O'CLOCK | 1 O'CLOCK | ... | ... | ... | ... |
| POWER DEMAND [MW] | 100 | 95 | ... | ... | ... | ... |

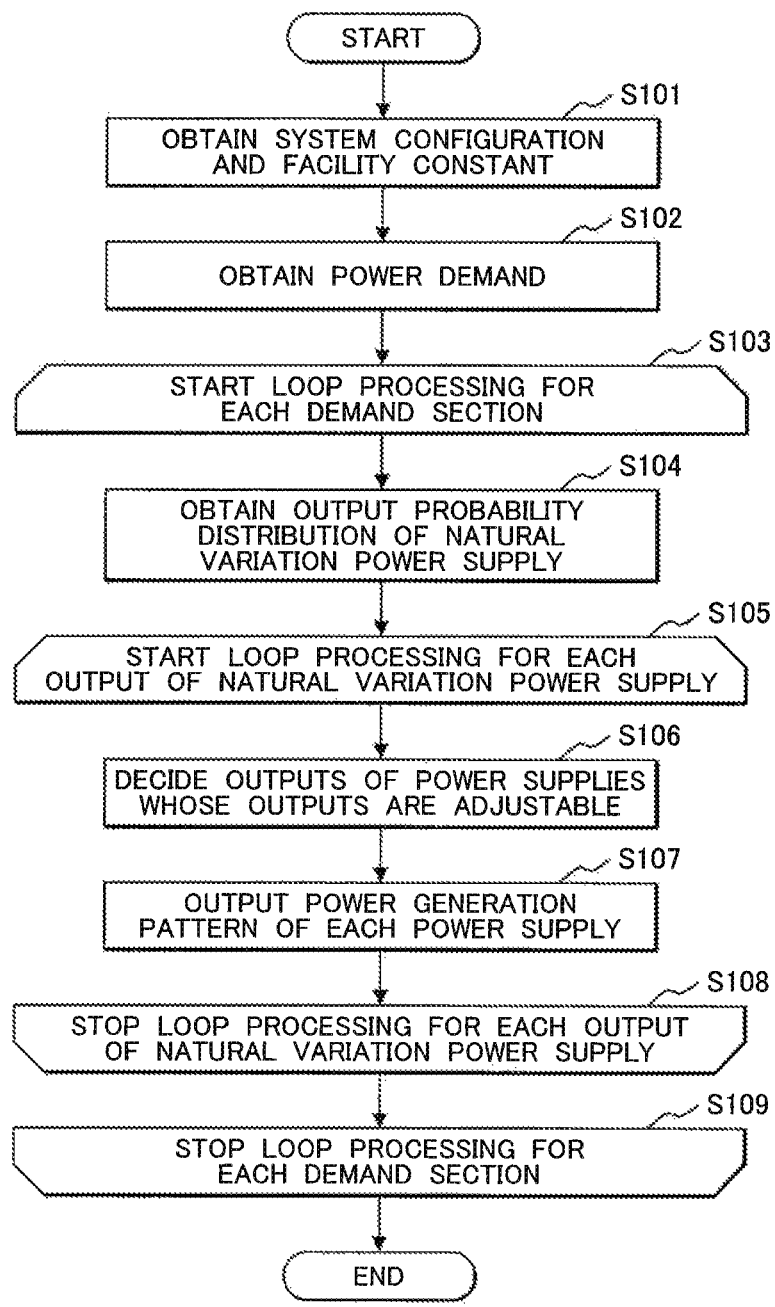

FIG. 11

| [DEMANDED QUANTITY] | | | | |
|---|---|---|---|---|
| DEMAND SECTION | DEMAND SECTION No.1 | | DEMAND SECTION No.2 | ... |
| CONSUMING REGION | CONSUMING REGION A | CONSUMING REGION B | ... | ... |
| POWER DEMAND [MW] | 100 | 200 | ... | ... |
| [GENERATED ELECTRIC ENERGY] | | | | |
| OCCURRENCE PROBABILITY | 0.5% | 0.3% | ... | ... |
| POWER GENERATION PATTERN | POWER GENERATION PATTERN 1 | POWER GENERATION PATTERN 2 | ... | ... |
| POWER PLANT | WIND POWER PLANT A | THERMAL POWER PLANT B | ... | POWER PLANT A | ... |
| OUTPUT OF POWER SUPPLY [MW] | 10 | 150 | ... | 12 | ... |

FIG. 13

| [DEMANDED QUANTITY] | | | | | | |
|---|---|---|---|---|---|---|
| DEMAND SECTION | DEMAND SECTION No.1 | | | | DEMAND SECTION No.2 | ... |
| [GENERATED ELECTRIC ENERGY] | | | | | | |
| OCCURRENCE PROBABILITY | 0.5% | 0.3% | ... | ... | ... | ... |
| POWER GENERATION PATTERN | POWER GENERATION PATTERN 1 | POWER GENERATION PATTERN 2 | ... | ... | ... | ... |
| [POWER FLOW] | | | | | | |
| BUS LINE | BUS LINE 1 | BUS LINE 2 | ... | ... | ... | ... |
| ACTIVE POWER [MW] | 70 | 60 | ... | ... | ... | ... |
| [STABILITY MARGIN] | | | | | | |
| ACTIVE POWER MARGIN [MW] | 30 | 20 | ... | ... | ... | ... |

*FIG. 15*

| [DEMANDED QUANTITY] | | | | | |
|---|---|---|---|---|---|
| DEMAND SECTION | DEMAND SECTION No.1 | | | DEMAND SECTION No.2 | ... |
| [GENERATED ELECTRIC ENERGY] | | | | | |
| OCCURRENCE PROBABILITY | 0.5% | 0.3% | ... | ... | ... |
| POWER GENERATION PATTERN | POWER GENERATION PATTERN 1 | POWER GENERATION PATTERN 2 | ... | ... | ... |
| [STABILITY MARGIN] | | | | | |
| OPERATION LIMIT EXCESS PROBABILITY | 0.04% | 0% | ... | ... | ... |

FIG. 17

| [DEMANDED QUANTITY] | | | | | |
|---|---|---|---|---|---|
| DEMAND SECTION | DEMAND SECTION No.1 | | | ... | |
| [GENERATED ELECTRIC ENERGY] | | | | | |
| OCCURRENCE PROBABILITY | 0.5% | | | ... | ... |
| POWER GENERATION PATTERN | POWER GENERATION PATTERN 3 | | | ... | ... |
| [OUTPUT CONTROL] | | | | | |
| NATURAL VARIATION POWER SUPPLY | WIND POWER PLANT A | WIND POWER PLANT B | ... | ... | ... |
| CONTROLLED POWER [MW] | 8 | 3 | ... | ... | ... |

FIG. 18

| [OUTPUT CONTROL] | | | | | | |
|---|---|---|---|---|---|---|
| NATURAL VARIATION POWER SUPPLY | WIND POWER PLANT A | | WIND POWER PLANT B | | ... | ... |
| EXPECTED VALUE OF TOTAL CONTROLLED ELECTRIC ENERGY [MW/YEAR] | 500 | | 600 | | | |
| CONTROLLED POWER [MW] | 8 | ... | 3 | ... | ... | ... |
| OCCURRENCE PROBABILITY | 0.5% | ... | 0.5% | ... | ... | ... |

FIG. 20

FACILITY EXPANSION PLANNING

| TYPE OF FACILITY | SVC | PHASE ADVANCE CAPACITOR | ... |
|---|---|---|---|
| FACILITY INTRODUCTION LOCATION | BUS LINE 1 | BUS LINE 4 | ... |
| CAPACITY | 10 [MVA] | 5 [Mvar] | ... |
| FACILITY INTRODUCTION COST | ○○ [YEN] | | |
| MAINTENANCE COST | △△ [YEN/YEAR] | | |

OUTPUT CONTROLLED ELECTRIC ENERGY

| POWER SUPPLY | POWER PLANT A | POWER PLANT B | ... |
|---|---|---|---|
| OUTPUT CONTROL QUANTITY | 500 [MWh/YEAR] | 600 [Wh/YEAR] | ... |
| REDUCED OUTPUT CONTROL QUANTITY OWING TO FACILITY EXPANSION | 300 [MWh/YEAR] | 400 [MWh/YEAR] | ... |

ELECTRIC POWER TRANSMISSION FACILITY PLANNING SUPPORT SYSTEM AND THE METHOD THEREOF

CLAIM OF PRIORITY

The present application claims priority from Japanese Patent application serial no. 2015-033490, filed on Feb. 24, 2015, the content of which is hereby incorporated by reference into this application.

BACKGROUND

The present invention relates to an electric power transmission facility planning system and the method thereof for making a facility planning of an electric power transmission network.

One of background technologies of this technology field is disclosed in Japanese Unexamined Patent Application Publication No. 2013-126260. This Japanese Unexamined Patent Application Publication describes, "Total output determination means determines whether or not an allowable total output, which is calculated by allowable total output calculation means at the current time point, goes above the total output of natural variation power supplies, which is calculated by total output calculation means at the current time point. A maximum output command value calculation means calculates the maximum output command value of each natural variation power supply within a range within which the total output of the natural variation power supplies satisfies the allowable total output at the current time point on the basis of the determination results from the total output determination means, and outputs the maximum output command value to each natural variation power supply via an output processing means (Refer to ABSTRACT of this Japanese Unexamined Patent Application Publication)". In addition, there is Japanese Unexamined Patent Application Publication No. 2004-242411 as a relevant literature. This Japanese Unexamined Patent Application Publication describes, "There are provided selection means that selects a candidate for system configuration that does not cause a trouble in power feeding at a normal time, and also does not cause a trouble in power feeding at an assumed accident from a plurality of system configurations, and an evaluation value calculation means that calculates the expected value of a power-failure time, the degree of the deviation of a facility operation rate, and a power transmission loss of the candidate for system configuration selected by the selection means as evaluation values. An evaluation vector is created on the basis of the three evaluation values obtained by the evaluation value calculation means, and the degree of supply reliability of the power supply system is multilaterally evaluated".

SUMMARY

Japanese Unexamined Patent Application Publication No. 2013-126260 discloses the operation method of natural variation power supplies in which the supply power of the natural variation power supplies becomes the maximum while the system frequency is kept constant. However, stabilities that should be evaluated on each bus line such as a voltage stability that is a capability for keeping a system voltage stable and a synchronization stability that is a capability for keeping the synchronous operation of a power supply are not taken into consideration. There may be assumed a possibility that stability on each bus line becomes problematic owing to the increase of the types of natural variation power supply and the growing diversity of the locations of power supplies. Therefore, if only the system frequency is taken into consideration when several natural variation power supplies are operated, the instability of the system might occur in some situations.

Japanese Unexamined Patent Application Publication No. 2004-242411 discloses a method in which the degree of supply reliability is evaluated using the expected value of a power-failure time, a power transmission loss, and a facility operation rate, and the effectiveness of facility investment is evaluated. However, in this Japanese Unexamined Patent Application Publication, because a facility investment cannot be evaluated in consideration of the output control quantities of natural variation power supplies, an effective facility expansion planning for alleviating the output controls of the natural variation power supplies cannot be drawn out.

Therefore, in the present invention, a probability distribution that the operation limit of electric power transmission capacity on each bus line becomes equal to a predefined value or smaller is calculated, and an output control quantity [Wh] for each power supply is derived using a means that allocates output controlled power [W] in that situation to each natural variation power supply. In the present invention, a device, which decides the location and capacity of an expanded facility on the basis of a reduced output control quantity [Wh] owing to the facility expansion and a facility introduction cost, is provided.

In order to solve the abovementioned problem, the present invention provides an electric power transmission facility planning support system for materializing facility planning including the facility expansion of an electric power transmission network on the basis of the system information of a power system, wherein the electric power transmission facility planning support system is characterized by an output control quantity calculation device for deriving the output control quantities of natural variation power supplies in consideration of the operation limit value of the electric power transmission network; and a facility expansion planning device for making the facility planning on the basis of one of the type, location, and capacity of an electric power transmission facility in consideration of the output control quantities.

The expansion of an electric power transmission facility, which is effective for reducing the output control quantities of natural variation power supplies, can be planned. The output control quantities after the facility expansion are provided to respective natural variation power supplies (electric power suppliers).

BRIEF DESCRIPTION OF THE DRAWINGS

FIG. 5 is an explanatory diagram showing data stored by an operation limit DB according to an embodiment of the present invention;

FIG. 6 is an explanatory diagram showing data stored by an expanded facility DB according to an embodiment of the present invention;

FIG. 7 is an explanatory diagram showing input data received by an input device according to an embodiment of the present invention;

FIG. 10 is a flowchart showing the processing of a power supply output decision unit according to an embodiment of the present invention;

FIG. 11 is an explanatory diagram showing the processing data of a power supply output decision unit according to an embodiment of the present invention;

FIG. 13 is an explanatory diagram showing the processing data of an operation limit comparison unit according to an embodiment of the present invention;

FIG. 15 is an explanatory diagram showing the processing data of a probability calculation unit according to an embodiment of the present invention;

FIG. 17 is an explanatory diagram showing the processing data of a control quantity allocation unit according to an embodiment of the present invention;

FIG. 18 is an explanatory diagram showing the processing data of a control quantity allocation unit according to an embodiment of the present invention;

FIG. 20 is an explanatory diagram showing screen display data according to an embodiment of the present invention.

DETAILED DESCRIPTION

Hereinafter, an embodiment will be explained with reference to the accompanying drawings.

First Embodiment

In this embodiment, an example of an electric power transmission facility planning support system 1, in which the expansion of an electric power transmission facility effective for reducing the output control quantities of natural variation power supplies is planned, will be explained.

Figures 1, 2:
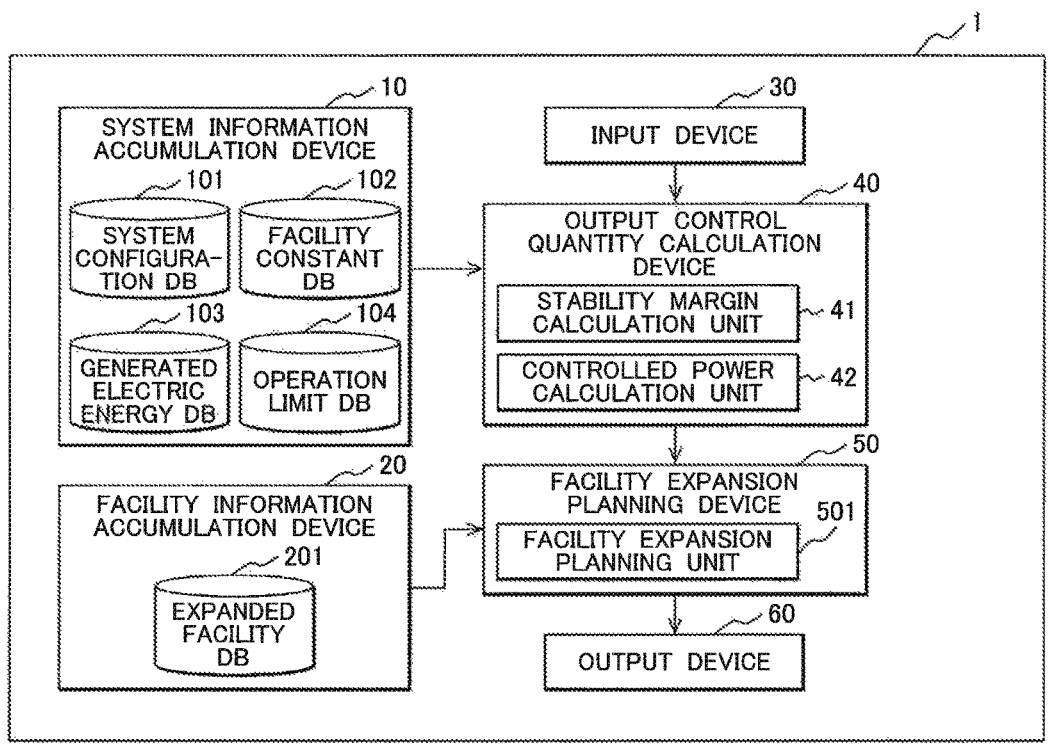
FIG. 1 is a block diagram showing an electric power transmission facility planning support system according to an embodiment of the present invention.
FIG. 2 is an explanatory diagram showing data stored by a generated electric energy DB according to an embodiment of the present invention.

FIG. 1 is a block diagram showing an electric power transmission facility planning support system according to this embodiment.

The electric power transmission facility planning support system includes: a system information accumulation device 10; a facility information accumulation device 20; an input device 30; an output control quantity calculation device 40; a facility expansion planning device 50; and an output device 60.

The system information accumulation device 10 includes: a system configuration DB 101; a facility constant DB 102; a generated electric energy DB 103; and an operation limit DB 104.

The system configuration DB 101 stores, for example, the locations of electric generators, loads, and transformer stations, and connection conditions in which the electric generators, loads, and transformer stations are connected to electric power transmission lines.

The facility constant DB 102 stores the parameters of respective facilities which are stored by the system configuration DB 101. The facility constant DB 102 stores, for example, information about the impedances and admittances of the electric power transmission lines, and the reactances of the transformer stations. Furthermore, the facility constant DB 102 stores the upper limits and lower limits of active powers that power plants can supply, and those of reactive powers that the electric generators can supply. The facility constant DB 102 stores the output adjustment velocities of power plants that can adjust their output electric energies.

FIG. 2 is an example of data stored by the generated electric energy DB 103. The generated electric energy DB 103 stores the type and name of a natural variation power supply, the location and capacity of the power supply by associating them with each other. In addition, the generated electric energy DB 103 stores the probability distributions of outputs of power supplies. The generated electric energy DB 103 stores the output variation range of each output. The probability distribution of the output of the power supply, and the probability distribution of the output variation range depend on a wind condition in the case of a wind power plant, and depend on the amount of solar radiation in the case of a solar power plant, for example. The probability distributions of outputs of power supplies, and the probability distributions of output variation ranges can be obtained from the values obtained by actual achievements or values calculated in consideration of the wind conditions or the amounts of solar radiation at the locations of natural variation power supplies.

Figure 3:
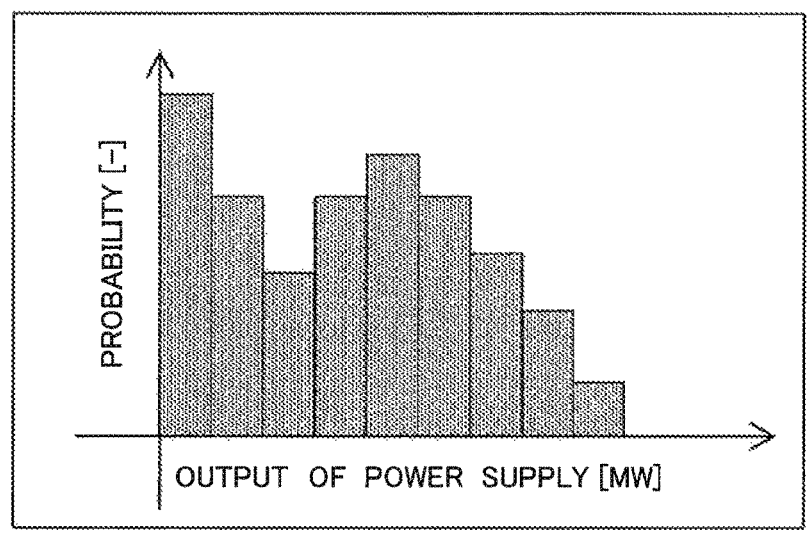
FIG. 3 is an explanatory diagram showing a probability distribution of the output of a power supply stored by a generated electric energy DB according to an embodiment of the present invention.

FIG. 3 is an example of the probability distribution of the outputs of a power supply stored by the generated electric energy DB 103. FIG. 3 is a diagram in which the outputs and the probabilities of the outputs of a natural variation power supply are plotted. The probabilities can be directly calculated or can be calculated from the cumulative operation time of each output. Alternatively, plural probability distributions associated with times or seasons are stored, and a suitable probability distribution can be adopted.

Figure 4:
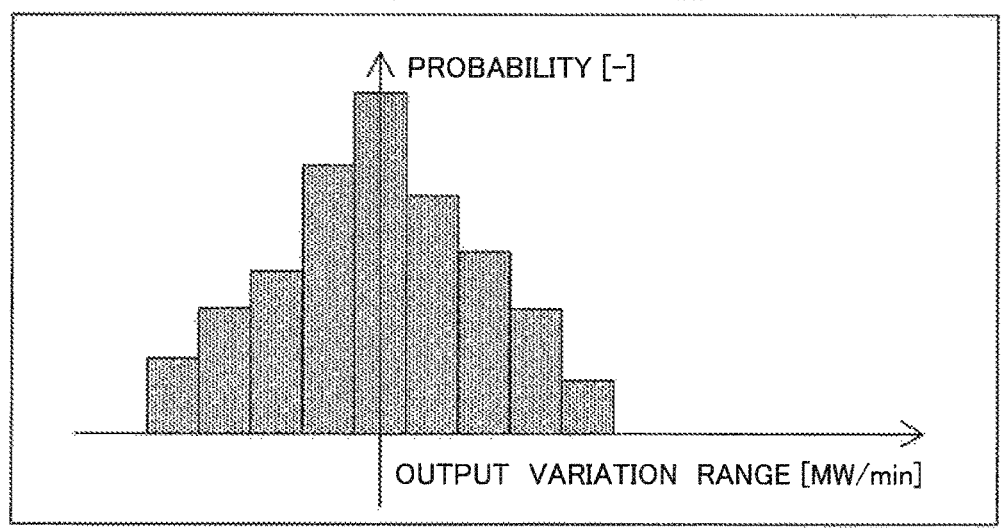
FIG. 4 is an explanatory diagram showing a probability distribution of an output variation range stored by a generated electric energy DB according to an embodiment of the present invention.

FIG. 4 shows an example of the probability distribution of output variation ranges stored by the generated electric energy DB 103. FIG. 4 is a diagram in which the output variation ranges and the probabilities of the output variation ranges of the output of a power supply. The probabilities can be directly calculated or can be calculated from the cumulative times of the output variation ranges. Alternatively, plural probability distributions associated with times or seasons are stored, and a suitable probability distribution can be adopted.

FIG. 5 shoes an example of data stored by the operation limit DB 104. The operation limit DB 104 stores the ranges of power flow values within which electric powers can be stably transmitted even if an accident occurs in a power system. A power flow includes, for example, the maximum value of an active power and the maximum value of a reactive power that can be transmitted on each bus line in a power system, the upper and lower limits of voltage on each bus line, and the upper and lower limits of the phase difference angle of voltage.

The facility information accumulation device 20 includes an expanded facility DB 201.

FIG. 6 shows an example of data stored by the expanded facility DB 201. The expanded facility DB 201 stores, for example, the types of expanded facility, capacities, introduction costs, maintenance costs. The expanded facilities stored by the expanded facility DB 201 are, for example, SVCs, which are phase modifiers, power capacitors, and branch reactors. In this embodiment, the facility expansion means the introduction of phase modifiers, but it can also mean the expansion or replacement of electric power transmission lines.

FIG. 7 is an example of input data input into the input device 30. The input device 30 receives power demands on the relevant system from users. The input device 30 receives information including, for example, the location of a consuming region, a date, a time, a power demand that are associated with each other. The power demand can be a predicted value obtained from past actual achievements.

Figure 8:
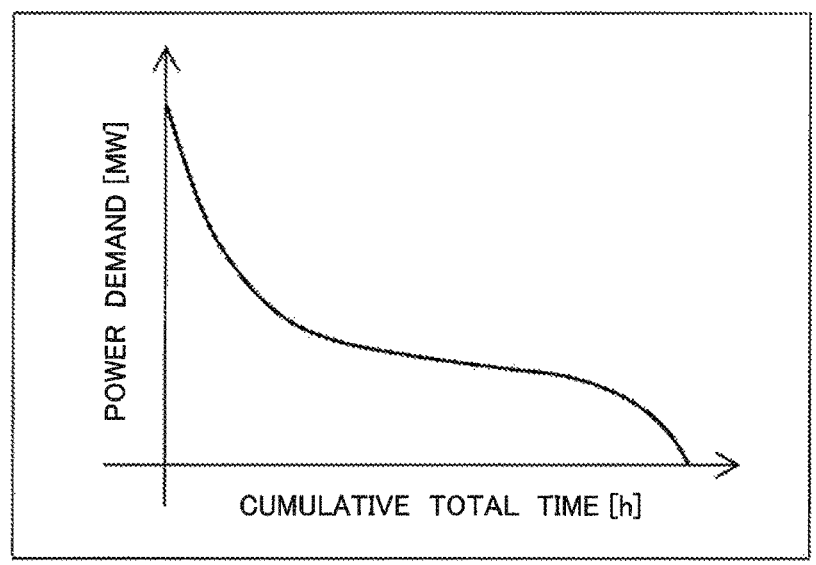
FIG. 8 is a graph showing data concerning a power demand received by an input device according to an embodiment of the present invention.

FIG. 8 is a graph showing power demands received by the input device 30. FIG. 8 is a graph showing the power demands per hour which are sorted in descending order.

Figure 9:
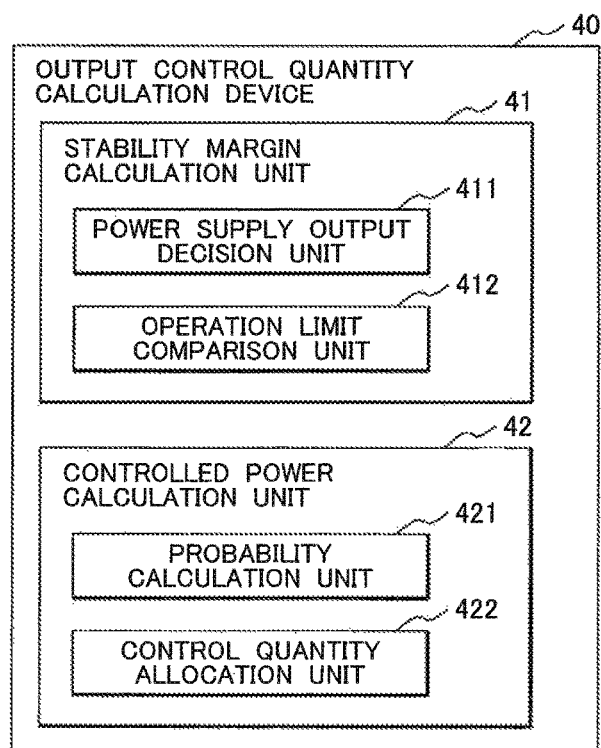
FIG. 9 is a block diagram showing a stability margin calculation unit according to an embodiment of the present invention.

FIG. 9 shows an example of the block diagram of a stability margin calculation unit 41.

The output control quantity calculation device 40 includes a stability margin calculation unit 41 and a controlled power calculation unit 42. The stability margin calculation unit 41 includes a power supply output decision unit 411 and an operation limit comparison unit 412.

FIG. 10 is a flowchart showing the processing of the power supply output decision unit 411. Hereinafter, the processing shown in FIG. 10 will be explained while the processing data of the power supply output decision unit 411 shown in FIG. 11 will be appropriately referred to.

At step S101, the power supply output decision unit 411 obtains a system configuration and a facility constant from the system configuration DB 101 and the facility constant DB 102 respectively.

At step S102, the power supply output decision unit 411 obtains power demands during a certain time period from the input device 30, and allocates a section number to a power demand section at each time. The power supply output decision unit 411 stores section numbers in Row "DEMAND SECTION", consuming regions in Row "CONSUMING REGION", and a power demand at each consuming region in Row "POWER DEMAND". Furthermore, the power supply output decision unit 411 stores the names of consuming regions, which are associated with the system configuration DB 101, in Row "CONSUMING REGION".

At steps S103 to S109, the power supply output decision unit 411 executes loop processing for each demand section that is a calculation target among the power demands obtained during the certain time period at step S102.

At step S104, the power supply output decision unit 411 obtains the output probability distribution of a natural variation power supply from the generated electric energy DB 103. Using the season, the date, or the time of a target demand section as keys, the power supply output decision unit 411 can obtain the probability distribution of the output of the power supply formed corresponding to the season, the date, and the time from the generated electric energy DB 103.

At steps S105 to S108, the power supply output decision unit 411 executes loop processing for each output within the range of the output probability distribution of the natural variation power supply obtained at step S104. In addition, in this loop processing, the probability of the output of the selected power supply is obtained from the output probability distribution, and the probability is stored in Row "OCCURRENCE PROBABILITY" shown in FIG. 11.

At step S106, the power supply output decision unit 411 decides the output of an output-adjustable power supply using the target demand section among the power demands obtained during the constant time period at step S102, the output of the natural variation power supply selected at step S103, and the system configuration and the facility constant obtained at step S101. The output-adjustable power supply is, for example, a thermal power plant. The output of the output-adjustable power supply is decided by the rated power output and the upper and lower limits of the output of the power plant. Alternatively, the output of the output-adjustable power supply can be decided using the fuel cost of the plant.

At step S107, the power supply output decision unit 411 allocates a power generation pattern number to the output of each power supply that is decided at steps S105 and S106, and stores the power generation pattern number in Row "POWER GENERATION PATTERN". Furthermore, the power supply output decision unit 411 stores respective power supplies including natural variation power supplies and output-adjustable power supplies in Row "POWER PLANT", and stores the generated electric energy of each power supply in Row "OUTPUT OF POWER SUPPLY".

Figure 12:
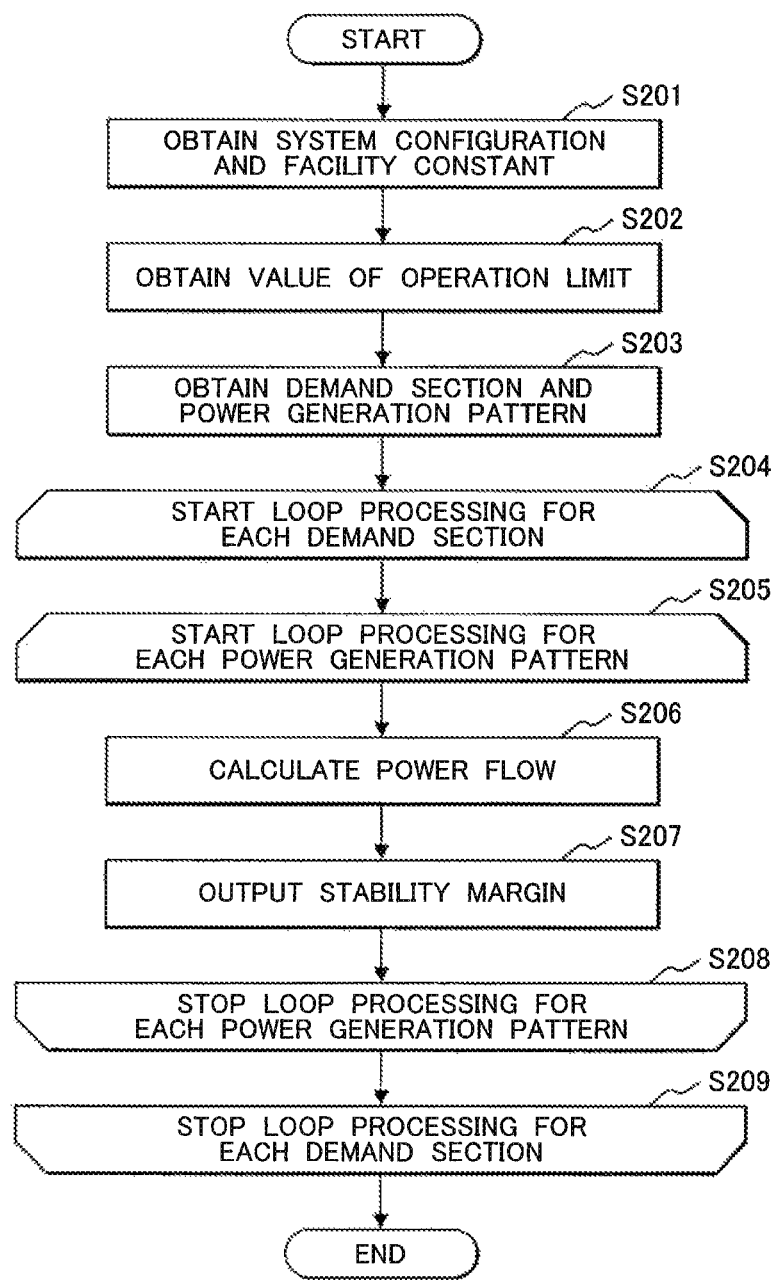
FIG. 12 is a flowchart showing the processing of an operation limit comparison unit according to an embodiment of the present invention.

FIG. 12 is a flowchart showing the processing of the operation limit comparison unit 412. Hereinafter, the processing shown in FIG. 12 will be explained while the processing data of the operation limit comparison unit 412 shown in FIG. 13 will be appropriately referred to.

The process of step S201 is the same as that of step S101 shown in FIG. 10.

At step S202, the operation limit comparison unit 412 obtains the operation limit value of each bus line from the operation limit DB 104.

At step S203, the operation limit comparison unit 412 obtains a section number from Row "DEMAND SECTION", and a demanded quantity at each consuming region from Row "POWER DEMAND" and Row "CONSUMING REGION" in FIG. 11 that shows the calculation results of the power supply output decision unit 411. In addition, the operation limit comparison unit 412 obtains the occurrence probability of a power generation pattern from Row "OCCURRENCE PROBABILITY" in FIG. 11; a power generation pattern number from Row "POWER GENERATION PATTERN" in FIG. 11; and an output quantity at each power station from Row "OUTPUT OF POWER SUPPLY" and Row "POWER STATION" in FIG. 11. The operation limit comparison unit 412 stores the obtained the demand number of the demanded quantity in Row "DEMAND SECTION" in FIG. 13; the obtained occurrence probability of the power generation pattern in Row "OCCURRENCE PROBABILITY" in FIG. 13; and the obtained power generation pattern number in Row "POWER GENERATION PATTERN" in FIG. 13 respectively.

At steps S204 to S209, the operation limit comparison unit 412 executes loop processing for each demand section obtained at step S203.

At steps S205 to S208, the operation limit comparison unit 412 executes loop processing for each power generation pattern obtained at step S203.

At step S206, the operation limit comparison unit 412 executes a power flow calculation using the demand section and the power generation pattern obtained at step S203, and the system configuration and the facility constant obtained at step S201. The operation limit comparison unit 412 stores the calculation results of the power flow calculation in Row "BUS LINE" and Row "ACTIVE POWER" in FIG. 13 for each bus line. The operation limit comparison unit 412 stores the number of the bus line corresponding to the system configuration DB 101 in Row "BUS LINE", and the active power calculated in the power flow calculation in Row "ACTIVE POWER". Now, in this embodiment, although only active powers are calculated in the calculation of the power flow, the operation limit comparison unit 412 can calculate reactive powers, the voltages of the bus lines, and the phase difference angles of the bus lines, and can store these values in FIG. 13.

At step S207, the operation limit comparison unit 412 compares the calculation result of the power flow obtained in step S206 with the operation limit value obtained in step S202, and calculates stability margins. The operation limit comparison unit 412 obtains a stability margin, for example, by subtracting the value of the active power obtained at step S206 from the maximum value of the active power at the operation limit. The operation limit comparison unit 412 stores the calculated stability margin in Row "ACTIVE POWER MARGIN" in FIG. 13. Now, in this embodiment just like step S206, although only the stability margins of the active powers are calculated in the calculation, the operation limit comparison unit 412 can calculate the stability margins of reactive powers, the stability margins of the voltages of the bus lines, and the stability margins of the phase difference angles of the bus lines, and can store these values in FIG. 13.

Here, although the power supply output decision unit 411 and the operation limit comparison unit 412 derive stability margins by repeating calculations for respective demand sections and power generation patterns as described above, they can use a method of directly calculating stability margins in which, for example, the relations among the demanded electric energies of consuming regions, the generated electric energies of power plants, and the relevant stability margins are approximated by functions and a stability margin to be obtained is directly derived without calculating a power flow.

The controlled power calculation unit 42 includes a probability calculation unit 421 and a control quantity allocation unit 422.

Figure 14:
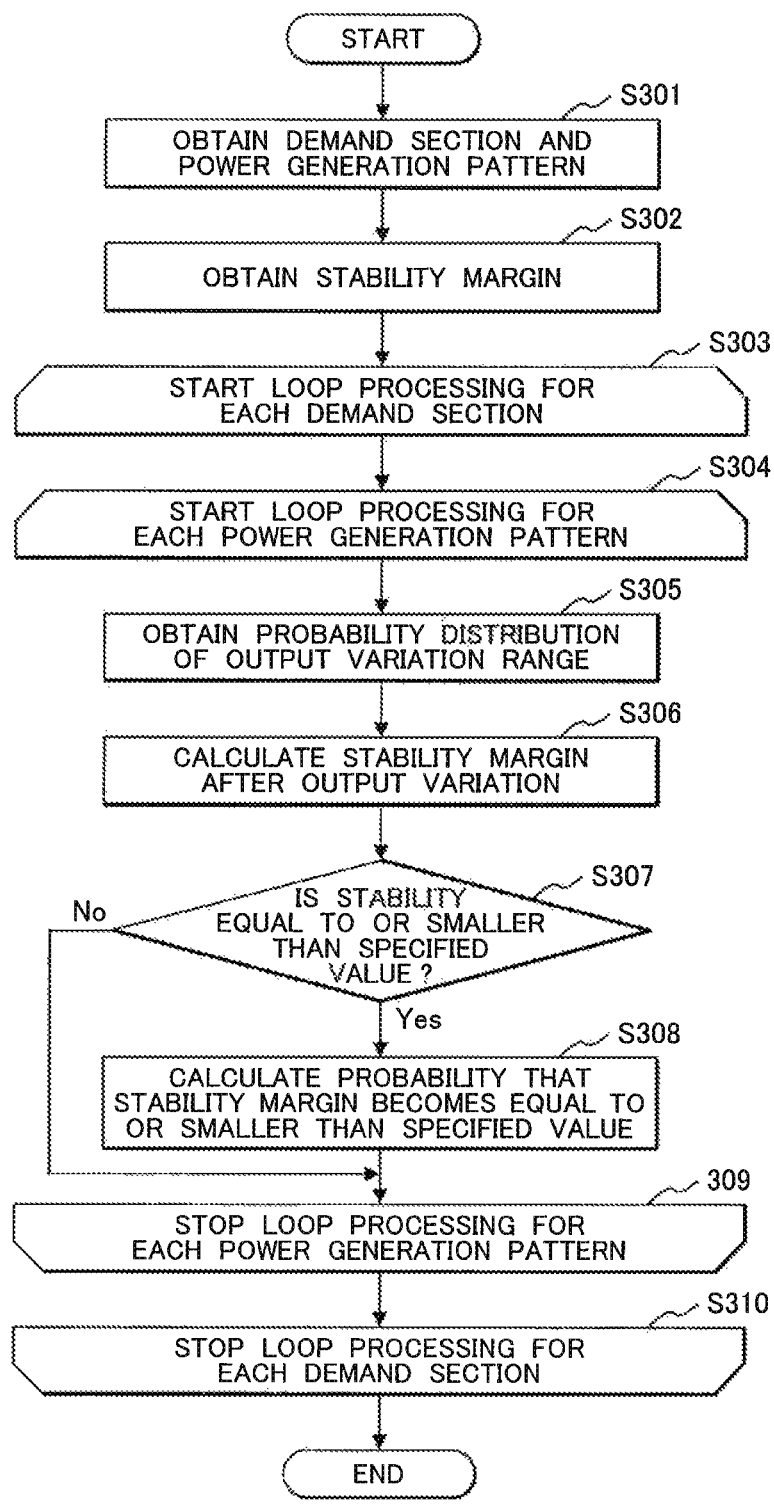
FIG. 14 is a flowchart showing the processing of a probability calculation unit according to an embodiment of the present invention.

FIG. 14 is a flowchart showing the processing of the probability calculation unit 421. Hereinafter, the processing shown in FIG. 14 will be explained while the processing data of the probability calculation unit 421 shown in FIG. 15 will be appropriately referred to.

At step S301, the operation limit comparison unit 421 obtains a section number from Row "DEMAND SECTION", and a demanded quantity at each consuming region from Row "POWER DEMAND" and Row "CONSUMING REGION" in FIG. 11 that shows the calculation results of the power supply output decision unit 411. Furthermore, the probability calculation unit 421 obtains the occurrence probability of a power generation pattern from Row "OCCURRENCE PROBABILITY" in FIG. 11; a power generation pattern number from Row "POWER GENERATION PATTERN" in FIG. 11; and an output quantity at each power station from Row "OUTPUT OF POWER SUPPLY" and Row "POWER STATION" in FIG. 11.

At step S302, the probability calculation unit 421 obtains an active power and an active power margin for each bus line from Row "ACTIVE POWER", Row "ACTIVE POWER MARGIN", and Row "BUS LINE" in FIG. 13 that shows the calculation results of the operation limit comparison unit 412.

At steps S303 to S308, the probability calculation unit 421 executes loop processing for each demand section obtained at step S302.

At steps S304 to S307, the probability calculation unit 421 executes loop processing for each power generation pattern obtained at step S302.

At step S305, the probability calculation unit 421 obtains the probability distribution of an output variation range from the power generation DB 103 using the output of a natural power supply obtained at step S301 as a key.

At step S306, the probability calculation unit 421 calculates a stability margin for each bus line after an output variation using the demand section and the power generation pattern obtained at step S301, the active power and the active power margin obtained at step S302, and the output variation range obtained at step S305.

The probability calculation unit 421 derives an active power after the output variation for each line by, for example, linearly approximating the relation between an output variation range and a variation quantity of the active electric energy for each bus line, and calculates a stability margin. Because the calculation is executed with the use of the same demand section, the same system configuration, and the same facility constant, and because the output variation range is very small in comparison to the total generated electric energy as well, the value derived from this linear approximation has a small error.

Alternatively, the probability calculation unit 421 can calculate the stability margin after the output variation for each bus line by repeating the power flow calculation just like the processing of the operation limit comparison unit 412.

At step S307, the probability calculation unit 421 judges whether or not the stability margin after the output variation for each bus line is equal to or smaller than a predefined value. For example, when the predefined value is 0, the stability margin is exceeded owing to the output variation. If the stability margins of all bus lines are larger than the predefined value, the flow proceeds to step S309.

At step S308, the probability calculation unit 421 calculates a probability that there exists a bus line whose stability margin becomes equal to or smaller than the predefined value. The probability calculation unit 421 calculates the probability using the occurrence probability of the power generation pattern obtained at step S301 and the probability distribution of the output variation range obtained at step S305. The probability calculation unit 421 regards the calculated probability as a probability that the stability margin becomes equal to or smaller than the predefined value, that is to say, a probability that the operation limit is exceeded, and stores the calculated probability in Row "OPERATION LIMIT EXCESS PROBABILITY" in FIG. 15.

Figure 16:
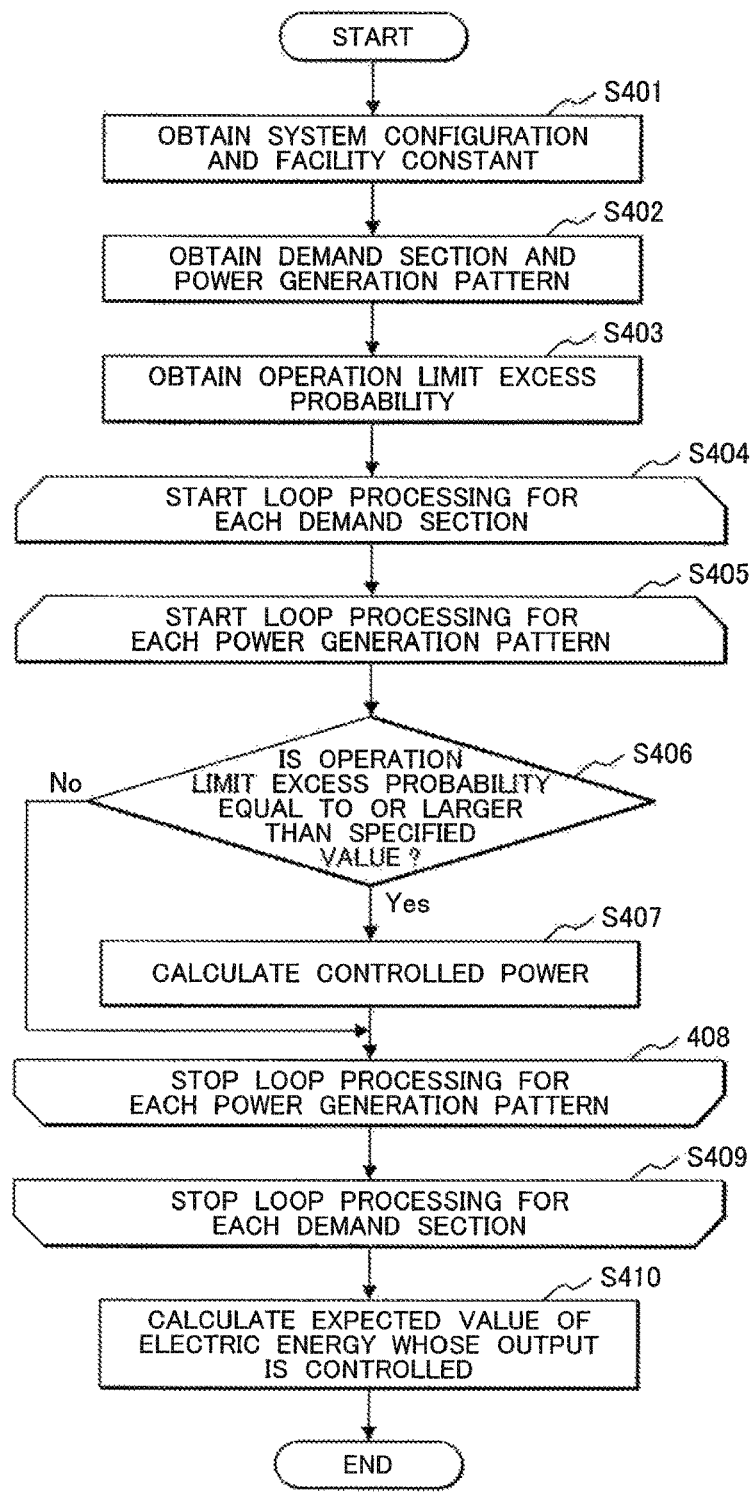
FIG. 16 is a flowchart showing the processing of a control quantity allocation unit according to an embodiment of the present invention.

FIG. 16 is a flowchart showing the processing of the control quantity allocation unit 422. Hereinafter, the processing shown in FIG. 16 will be explained while the processing data of the control quantity allocation unit 422 shown in FIG. 17 and FIG. 18 will be appropriately referred to.

The processes of steps S401 and S402 are the same as those of steps S201 and S203 shown in FIG. 12 respectively.

At step S403, the control quantity allocation unit 422 obtains a probability that stability becomes equal to or smaller than the predefined value from Row "OPERATION LIMIT EXCESS PROBABILITY" shown in FIG. 15 that shows the calculation results of the power supply output decision unit 411.

At steps S404 to S409, the control quantity allocation unit 422 executes loop processing for each demand section obtained at step S402.

At steps S403 to S408, the control quantity allocation unit 422 executes loop processing for each power generation pattern obtained at step S402.

At step S406, the control quantity allocation unit 422 judges whether or not the operation limit excess probability is equal to or larger than a predefined value. If the operation limit excess probability is smaller than the predefined value, the control quantity allocation unit 422 makes the flow proceed to step S407. For example, if the predefined value is set to 0, it means that things that have no possibility to exceed the operation limit are brought to the process of step S408.

At step S407, the control quantity allocation unit 422 calculates the necessary output controlled power of each natural variation power supply in order to make the probability of the operation limit being exceeded smaller than the predefined value. The control quantity allocation unit 422 obtains an output variation range of the natural variation power supply which falls within the operation limit using the relation between the power flow change of a bus line that exceeds the operation limit and the output variation range of the natural variation power supply. In addition, the control quantity allocation unit 422 derives the upper limit of the output from the calculated output variation range.

Alternatively, the control quantity allocation unit 422 can calculate the output controlled power of each natural variation power supply by allocating controlled power to each natural variation power supply in consideration of the output variation quantity of each natural variation power supply, and changing the allocated controlled power bit by bit until the probability of the operation limit being exceeded becomes smaller than the predefined value.

The control quantity allocation unit 422 stores the name of each natural variation power supply and the relevant calculated output controlled power in Row "NATURAL VARIATION POWER SUPPLY" and Row "CONTROLLED POWER" respectively.

At step S410, the control quantity allocation unit 422 calculates the expected value of electric energy whose output is controlled using the occurrence probability of each power generation pattern and the controlled power of each power generation pattern. The control quantity allocation unit 422 stores the calculated expected value of electric energy in Row "EXPECTED VALUE OF TOTAL CONTROLLED ELECTRIC ENERGY" in FIG. 18.

The facility expansion planning device 50 includes a facility expansion planning unit 501.

Figure 19:
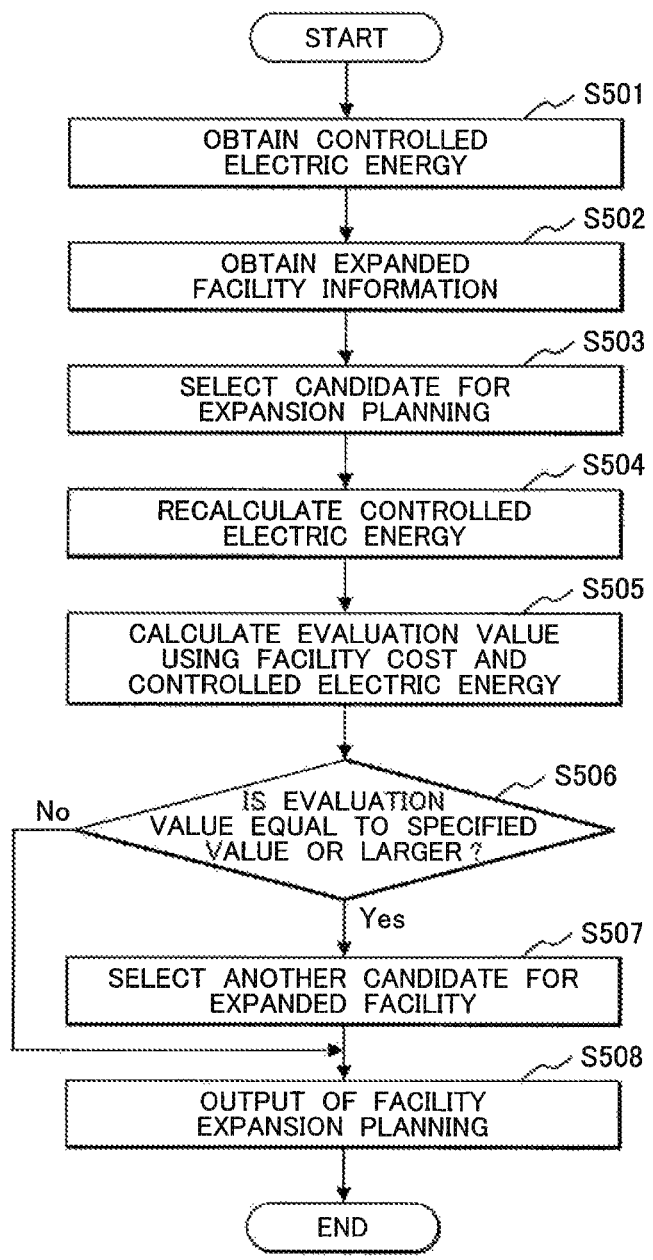
FIG. 19 is a flowchart showing the processing of a facility expansion planning unit according to an embodiment of the present invention.

FIG. 19 is a flowchart showing the processing of the facility expansion planning unit 501.

At step S501, the facility expansion planning unit 501 obtains controlled electric energy from Row "EXPECTED VALUE OF TOTAL CONTROLLED ELECTRIC ENERGY" in FIG. 18 that shows the calculation results of the control quantity allocation unit 422 of the facility expansion planning unit 501.

At step S502, the facility expansion planning unit 501 obtains facility information from the expanded facility DB 201. The facility expansion planning unit 501 obtains, for example, the type, capacity, introduction cost, and maintenance cost of an expanded facility as facility information.

At step S503, the facility expansion planning unit 501 selects a candidate for expansion planning. The facility expansion planning unit 501 selects, for example, the type, capacity of the facility, or the location where the facility is expanded as a candidate for expansion planning.

The location where the facility is expanded is selected in consideration of the probability of the operation limit being exceeded that is calculated by the output control quantity calculation device 40. Expansion planning effective for stabilizing the system can be selected by expanding a facility near to a bus line that has a high possibility of the operation limit being exceeded. The type of facility is selected in consideration of factors that cause the excess of the operation limit in the power flow of each bus line. The factors that cause the excess of the operation limit are, for example, the maximum value of an active power, the maximum value of a reactive power, the upper and lower limits of voltage, and the upper and lower limits of the phase difference angle of voltage. For example, in the case where there is a high possibility of the operation limit being exceeded owing to the upper or lower limits of voltage, it is effective to introduce a power capacitor or an SVC that compensate reactive power. A capacity of facility is selected in consideration of a quantity over the operation limit in the power flow of each bus line.

At step S504, the facility expansion planning unit 501 calculates controlled electric energy after the facility expansion. The facility expansion planning unit 501 calculates the controlled electric energy after the facility expansion by adding the expanded facility to the system facility DB 101 and the facility constant DB 102 and recalculating the controlled electric energy using the output control quantity calculation device. In the case where the value of the operation limit DB 104 changes after the facility expansion, an operation limit value after the change can be received from the relevant user, or can be obtained by calculation.

At step S505, the facility expansion planning unit 501 calculates an evaluation value using the cost of the expanded facility and the controlled electric energy. The evaluation value can be calculated by multiplying the controlled electric energy by an electric power selling cost to calculate a cost corresponding to the controlled electric energy, and adding the introduction cost and the maintenance cost of the expanded facility to the cost corresponding to the controlled electric energy.

At step S506, the facility expansion planning unit 501 judges whether or not the evaluation value calculated at step S505 is equal to or larger than a predefined value. For example, by setting the predefined value to the evaluation value before the facility expansion, the evaluation value before the facility expansion and the evaluation value after the facility expansion can be compared with each other. If the evaluation value is smaller than the predefined value, the facility expansion planning unit 501 makes the flow proceed to step S508.

At step S507, the facility expansion planning unit 501 selects another candidate for the expanded facility instead of the candidate selected at step S503. Items to be changed are, for example, the type, capacity of the facility, or the location where the facility is expanded.

At step S508, the facility expansion planning unit 501 outputs the candidate for the facility expansion selected at step S503.

FIG. 20 shows an example of the output of the output device 60. FIG. 20 shows an example of facility expansion planning and an example of output controlled electric energy of natural variation power supplies after the facility expansion as the processing results of the facility expansion planning unit 501. The output device 60 outputs, for example, a type of facility, an introduction location of the facility, a capacity of the facility, an introduction cost of the facility, a maintenance cost of the facility as facility expansion planning. The output device 60 outputs a reduced output control quantity obtained by comparing the output control quantity of each power supply after the facility expansion with that of each power supply before the facility expansion as the output controlled electric energy of each power supply. Alternatively, the output device 60 can output the processing data of the power supply output decision unit 411 shown in FIG. 11; the processing data of the operation limit comparison unit 412 shown in FIG. 13; the processing data of the probability calculation unit 421 shown in FIG. 15; and the processing data of the control quantity allocation unit 422 shown in FIG. 17 and FIG. 18.

By showing the reduced output control quantity of a natural variation power supply, the effectiveness on the alleviation of the output control of the power supply can be quantitatively evaluated in the deliberation of facility expansion planning.

By showing the cost of facility expansion and the reduced output control quantity, the deliberation of the facility expansion planning can be performed in consideration of investment effectiveness.

Because cost merit brought about by the reduction of output control can be evaluated in consideration of an electric power selling cost or a penalty cost corresponding to control, the investment effectiveness can be evaluated in comparison with the cost of the facility expansion.

By showing the reduced output control quantity, electric power suppliers can show the fairness of the facility expansion, and furthermore, by quantitatively showing the effectiveness of the facility expansion, the transparency of the facility expansion can be secured.

With reference to the outputs of the processing data shown in FIGS. 11, 13, 15, 17, and 18, demand situations and power generation situations that need the control of natural variation power supplies are explicitly shown, and these processing results can be utilized for the operation of the natural variation power supplies.

Here, the present invention is not limited by the above-described embodiment, and the present invention may include various modifications. For example, the above-described embodiment is explained in detail for better understanding of the present invention and it is not always necessary for the present invention to include all the configurations and elements described above.

LIST OF REFERENCE SIGNS

1 Electric Power Transmission Facility Planning Support System
10 System Information Accumulation Device
20 Facility Information Accumulation Device
30 Input Device
40 Output Control Quantity Calculation Device
50 Facility Expansion Planning Device
60 Output Device

What is claimed is:

1. An electric power transmission facility planning support system for materializing facility planning including facility expansion of an electric power transmission network based on system information of a power system, the electric power transmission facility planning support system comprising:
   an input device configured to receive the system information including power demands from the power system and an operation limit value of the electric power transmission network from a user;
   an output control quantity calculation device for deriving output control quantities of natural variation power supplies in the electric power transmission network based on the operation limit value of the electric power transmission network;
   a facility expansion planning device for making the facility planning including the facility expansion by adding an electric power transmission facility to the electric power transmission network based on one of type, location, and capacity of the electric power transmission facility in consideration of the output control quantities to provide voltage stability and synchronization stability in the power system while providing the facility expansion; and
   an output device configured to output reduced output control quantities to the natural variation power supplies, based on the facility expansion, such that power is allocated in the electric power transmission network according to a probability distribution of the operation limit on each of a plurality of bus lines in the electric power transmission network being equal to or less than a predefined value.

2. The electric power transmission facility planning support system according to claim 1,
   wherein the output control quantity calculation device calculates the probability of the operation limit of the electric power transmission network being exceeded at the time when the outputs of the natural variation power supplies vary on the basis of the probability distributions of the outputs and the probability distributions of the output variation ranges of the natural variation power supplies.

3. The electric power transmission facility planning support system according to claim 1,
   wherein the output control quantity calculation device calculates the output controlled powers of the natural variation power supplies that are necessary to keep the power flow of the electric power transmission network within the operation limit of the network for respective power supplies in consideration of the location and power flow of the electric power transmission network, the operation limit of which is exceeded, on the basis of the probability distributions of the outputs and the probability distributions of the output variation ranges of the natural variation power supplies.

4. The electric power transmission facility planning support system according to claim 2,
   wherein the output control quantity calculation device calculates the expected value of the total controlled electric energy of the natural variation power supplies for respective power supplies on the basis of the probability of the operation limit of the electric power transmission network being exceeded and the output controlled power of each of the natural variation power supplies necessary to keep the power flow within the operation limit.

5. The electric power transmission facility planning support system according to claim 1,
   wherein the facility expansion planning device decides one of the type, location, and capacity of the expanded facility in consideration of a reduced output control quantity owing to the facility expansion and the facility cost.

6. The electric power transmission facility planning support system according to claim 1,
wherein the electric power transmission facility planning support system displays one of the type, introduction location, capacity, introduction cost, and maintenance cost of the facility as the facility expansion in consideration of the calculation result of the facility expansion planning device, and displays an output control quantity after the facility expansion and a reduced output control quantity owing to the facility expansion for each natural variation power supply as the output controlled quantities.

7. An electric power transmission facility planning support method for materializing facility planning including facility expansion of an electric power transmission network based on system information of a power system, the electric power transmission facility planning support method comprising:
receiving the system information including power demands from the power system and an operation limit value of the electric power transmission network from a user;

deriving output control quantities of natural variation power supplies in the electric power transmission network based on the operation limit value of the electric power transmission network;

making the facility planning including the facility expansion by adding an electric power transmission facility to the electric power transmission network based on one of type, location, and capacity of the electric power transmission facility in consideration of the output control quantities to provide voltage stability and synchronization stability in the power system while providing the facility expansion; and outputting reduced output control quantities to the natural variation power supplies, based on the facility expansion, such that power is allocated in the electric power transmission network according to a probability distribution of the operation limit on each of a plurality of bus lines in the electric power transmission network being equal to or less than a predefined value.

* * * * *